3,524,913
GEL FORMING ALUMINUM HYDROXIDE OF
LOW ORDER OF REACTIVITY
Herbert T. Snyder, Morris Plains, and Arthur J. Sikora, Bernardsville, N.J., assignors to Warner-Lambert Pharmaceutical Company, Morris Plains, N.J., a corporation of Delaware
No Drawing. Filed Apr. 23, 1965, Ser. No. 450,514
The portion of the term of the patent subsequent to July 30, 1985, has been disclaimed
Int. Cl. A61k 27/00
U.S. Cl. 424—157   6 Claims

ABSTRACT OF THE DISCLOSURE

A method is described for producing gel forming aluminum hydroxide of a low order of reactivity. The process comprises the steps of (A) reacting aluminum sulfate and an alkali metal hydroxide at a temperature of from about 50° C. to about 60° C. for a period of about 1 to 5 minutes in an aqueous reaction medium having a pH of about 8.2 to about 8.9; (B) diluting the reaction slurry, obtained in Step (A), with water and aging the slurry, so diluted, for a period of from about 45 minutes to about 2 hours at a temperature of from about 50° C. to about 90° C.; and (C) filtering the aged slurry, obtained in Step (B), to recover the gel forming aluminum hydroxide.

---

This invention relates to a novel method for the production of a new, improved gel forming aluminum hydroxide of a low order of reactivity which is especially useful in pharmaceutical preparations. More particularly, the present invention relates to a method for the preparation of improved gel forming aluminum hydroxide prepared by reaction of aluminum sulfate and alkali metal hydroxide in an aqueous reaction medium maintained under carefully controlled reaction conditions.

Various hydrous aluminum oxide gels are known and may be prepared by reacting a solution of an aluminum salt such as aluminum chloride or aluminum sulfate with an alkali such as sodium hydroxide, potassium hydroxide, or ammonia hydroxide. Typical examples of such known methods may be found in U.S. Pat Nos. 1,929,942, 2,590,833 and 3,112,995. Because the proportions and concentrations of the particular reactants and reaction conditions are vitally important in preparing hydrous aluminum oxide gels, it is apparent that even slight variations from known processing schemes may result in the preparation of a product having substantially improved characteristics over products prepared by the known methods.

Although satisfactory hydrous aluminum oxide gels can be prepared on a laboratory scale by various techniques known to the art, application of such techniques for production on a commercial scale has been impractical. Frequently, difficulty is encountered, for example, in filtering the prepared slurry and when accomplished by small batch filtration, commercial operation becomes extremely difficult and costly.

In accordance with the present invention, it is possible to prepare a new, improved gel forming aluminum hydroxide having great use in pharmaceutical preparations. Such preparations containing the new, improved gel forming aluminum hydroxide have proven to be highly satisfactory in pharmaceutical preparations primarily because of the ability of the new aluminum hydroxide to form gels upon reaction with excess 0.1 N hydrochloric acid or simulated gastric fluids, without excessive solubility therein and resultantly with a minimal formation of undesirable aluminum chloride. These preparations may be characterized as having excellent gel forming properties and are highly effective when taken orally for the treatment or relief of pain of peptic ulcers and the like. The superior characteristics of the new, improved gel forming aluminum hydroxide of the present invention is believed to be related to its ability to provide protective coating of the ulcer without the formation of undesirable by-products. Although the resulting aluminum hydroxide product so prepared is found especially useful in pharmaceutical preparations, a variety of other uses may be readily apparent such as for use as a treating and purifying agent.

It has now been found that by maintaining carefully controlled reaction conditions in an aqueous reaction system comprising a water-soluble aluminum salt and a soluble alkali metal hydroxide results in the preparation of a gel forming aluminum hydroxide having substantially improved characteristics and in particular, improved utility for relief of the pain of peptic ulcers over similar preparations employed heretofore. In addition, the process of the present invention is readily adaptable to continuous processing and thereby affords an improved method for preparing gel forming aluminum hydroxide, especially since the process of the present invention has great flexibility and commercial adaptability resulting in the lowering of the cost of producing gel forming aluminum hydroxide for use in pharmaceutical preparations. The present invention also provides the data needed for determining the proportion of reactants required to produce such an aluminum hydroxide and so represents a considerable advance over the prior state of the art.

It is, therefore, an important object of this invention to provide a method for the continuous preparation of gel forming aluminum hydroxide having improved characteristics and which is especially useful as a constituent in pharmaceutical preparations employed for the relief of pain of peptic ulcers and like gastric disorders.

It is another object of this invention to provide stable, thixotropic dispersion of gel forming aluminum hydroxide which differs in properties and uses from aluminum hydroxide preparations produced heretofore.

It is a further object of this invention to provide an improved gel forming aluminum hydroxide characterized by a low order of reactivity or solubility in 0.1 N hydrochloric acid or simulated gastric fluids.

These and other objects and advantages will become more apparent from the following detailed description of the present invention.

In accordance with this invention, gel forming aluminum hydroxide of a low order of reactivity may be prepared by reacting an aluminum salt with an alkali metal hydroxide in an aqueous reaction medium contained in a suitable reaction vessel equipped with suitable agitation means. The aluminum salt desirably employed in the persent reaction is aluminum sulfate, generally iron free, in aqueous solution while the alkali metal hydroxide is preferably sodium hydroxide. The reaction involved may be further illustrated by the following equation:

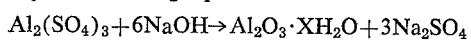

wherein X has a value from about 3.30 to about 3.80 and ideally about 3.55.

Control of the reaction conditions is vitually important in preparation of the gel forming aluminum hydroxide of the present invention. The pH of the reaction medium is desirably maintained between a pH of about 8.2 to about 8.9 and preferably at about 8.5 and may be controlled by the rate of addition of the reactants. It has been found that a general decrease in the pH is accompanied by an increase of soluble aluminum and sulfate in the final product whereas an increase in pH is generally accompanied by a desirable decrease in the soluble aluminum and sulfate content therein.

The temperature of the reaction medium is also of critical importance and is desirably maintained at a temperature from about 50° C. to about 60° C. throughout the reaction. A decrease in reaction temperature to and below 40° C. appears to result in a sharp increase in soluble aluminum and sulfate content in the final product whereas an increase in the temperature markedly lowers these properties to more desirable levels.

Agitation of the reaction medium is also important and may be defined as being mild with an agitation rate from about 100 r.p.m. to about 500 r.p.m. The preferred agitation rate is of the order of about 350 r.p.m. A general increase in the agitation rate appears to increase the soluble aluminum and sulfate content in the final product.

The contact time of the reaction appears also to be of importance and is desirably from about 1 to about 5 minutes, and desirably about 2-3 minutes while the reaction takes place within the reaction vessel. It is recognized, however, that some reaction continues in the slurry until filtration thereof.

After passing the reaction zone, the reaction slurry is continually overflowed to a holding tank wherein the slurry is diluted with about 0.5 part to about 2 parts by weight of water per part by weight of slurry. Desirably, the dilution is about one part by weight of water per part by weight of slurry. The diluted slurry is maintained in the holding tank for a period of time from about 45 minutes to about 2 hours, and preferably from about 60 to about 80 minutes while at a temperature of about 50° C. to about 90° C., and preferably from about 60° C. to about 70° C.

After the holding tank, the aged slurry may be continually overflowed to a filter trough or bath wherein the diluted slurry is added and directly filtered. The temperature of the diluted slurry is desirably maintained at the prescribed diluted temperature since no difficulty in filtration is encountered.

The diluted slurry is continuously filtered by any suitable means such as, for example, a drum filter wherein the wet filter cake is continually washed with either tap water or distilled water maintained at a temperature from about 80° C. to about 98° C. and generally about 90° C. to about 93° C. Although tap water is preferred for convenience and economy, distilled water may also be employed as in all other cases where water is used herein.

After the precipitated aluminum hydroxide has been filtered, the wet cake discharged from the filter may then be either dried for use in tablets, granulations and the like, or it may be added directly as a wet cake and made a constituent of a liquid therapeutic preparation.

When the aluminum hydroxide obtained as described above is processed to a dry form, a white, odorless powder which is essentially amorphous results.

When the aluminum hydroxide of the present invention is added to an excess of 0.1 N hydrochloric acid, a uniformly suspended hydrated colloidal gel is formed, the chemistry of which remains evasive. The soluble aluminum content, however, of the gel forming aluminum hydroxide is generally less than 8% by weight and desirably less than 6% by weight of the aluminum hydroxide originally added on a dry weight basis. In the dried form, analysis indicates that the prepared composition contains from about 50% to about 70% $Al_2O_3$.

In order to further illustrate the practice of the present invention, the following example is given:

EXAMPLE 0.25 gallon per minute of aluminum sulfate

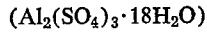

solution having 50% solids in solution and 0.08 gallon per minute of sodium hydroxide solution having 50% solids in solution, and one (1) gallon per minute of water maintained at a temperature from about 50° C. to 60° C. are introduced into a reaction equipped with a suitable agitator. The temperature of the reaction mixture is maintained at about 55° C. and a pH of about 8.5. An agitator suspended in the reactor is rotated at about 350 r.p.m. to suitably provide a mild vortex and insure complete mixing of the reactants. The contact time in the reactor is about 2-3 minutes after which the resultant slurry is continually overflowed to a holding tank wherein it is diluted with one part by weight of water per part by weight of slurry. The diluted slurry is held in the holding tank at a temperature of 60° C. to 70° C. for one hour. Thereafter, the diluted slurry is pumped to a filter where the slurry is filtered at a temperature of the diluted slurry. The filter cake is washed with about 1¼ gallons of water per pound of cake. The wash water is maintained at a temperature of about 90° C. The washed cake is removed from the filter at a rate of about two (2) pounds per minute and is found to have an $Al_2O_3$ analysis of about 12%. The wet cake is then dried in a suitable dryer maintained at a temperature of about 120° C. The dried product is found to have an $Al_2O_3$ content of about 61.3%, a soluble Al content less than 8%, and a total $SO_4$ content of about 5-6%. The acid-consuming capacity of this product, i.e. the capacity to neutralize 0.1 N HCl according to prescribed techniques is found to be about 80 ml. and desirably less per gram of dried gel. The dried cake may be ground to a fine powder capable of passing through at least a 140 mesh screen prior to being added as a constituent to an antacid preparation. This dried powder may then be formulated into tablets with other materials such as calcium carbonate, magnesium trisilicate, sodium bicarbonate, magnesium ammonium phosphate, oil of peppermint, saccharin and like materials. Alternately, the wet cake may be added directly as a constituent to a liquid therapeutic preparation along with materials such as oil of peppermint, magnesium ammonium phosphate, magnesium trisilicate and the like. Such therapeutic products containing the gel forming aluminum hydroxide as prepared herein are found to have great use in the treatment of gastric hyperacidity in peptic ulcer treatment.

It is understood that the foregoing detailed description is given merely by way of illustration and that many variations may be made therein without departing from the spirit of the present invention.

What is claimed is:

1. A method for the preparation of gel forming aluminum hydroxide of a low order of reactivity which comprises,
   (A) reacting aluminum sulfate with an alkali metal hydroxide in an aqueous reaction medium having a pH maintained at about 8.2 to about 8.9 and a reaction temperature of about 50° C. to about 60° C., said reaction being carried out by agitating the aqueous reaction medium at a rate of from about 100 r.p.m. to about 500 r.p.m. for a period of from about 1 to about 5 minutes;
   (B) aging the reaction slurry prepared by Step (A) after dilution of the slurry with from about 0.5 part to about 2 parts by weight of water per part by weight of slurry for an aging period of about 45 minutes to about 2 hours at a temperature of from about 50° C. to about 90° C.;
   (C) filtering the aged slurry of Step (B);
   (D) to recover the gel forming aluminum hydroxide.

2. A method for the preparation of gel forming aluminum hydroxide of low order of reactivity which comprises,
   (A) reacting aluminum sulfate with sodium hydroxide in an aqueous reaction medium having a pH maintained at about 8.2 to about 8.9 and a reaction temperature of from about 50° C. to about 60° C., said reaction being carried out by agitating the aqueous reaction medium at a rate of from about 100 r.p.m.

to about 500 r.p.m. for a period of from about 1 to about 5 minutes;

(B) aging the reaction slurry prepared by Step (A) after dilution of the slurry with from about 1 part by weight of water per part by weight of slurry for an aging period of about 45 minutes to about 2 hours at a temperature of from about 60° C. to about 70° C.;

(C) filtering the aged slurry of Step (B);

(D) to recover the gel forming aluminum hydroxide.

3. A method for the preparation of gel forming aluminum hydroxide of a low order of reactivity which comprises, (A) reacting aluminum sulfate with sodium hydroxide in an aqueous reaction medium having a pH maintained at about 8.2 to about 8.9 and a reaction temperature of about 50° C. to about 60° C., said reaction being carried out by agitating the aqueous reaction medium at a rate of from about 100 r.p.m. to about 500 r.p.m. for a period of from about 1 to about 5 minutes;

(B) aging the reaction slurry prepared by Step (A) at a temperature of from about 50° C. to about 90° C. after dilution of the slurry with about 1 part by weight of water per part by weight of slurry for an aging time of about 45 minutes to about 2 hours;

(C) filtering the aged slurry of Step (B);

(D) drying the discharged wet cake from the filter prepared by Step (C);

(E) to obtain the gel forming aluminum hydroxide as a substantially dry product.

4. The product prepared by the process of claim 1.

5. A method for the relief of peptic ulcers which comprises orally administering to a subject having a peptic ulcer, a therapeutically effective amount of gel forming aluminum hydroxide prepared by the method of claim 2.

6. A method for the relief of peptic ulcers which comprises orally administering to a subject having a peptic ulcer, a therapeutically effective amount of gel forming aluminum hydroxide prepared by the method of claim 3.

References Cited

UNITED STATES PATENTS 3,395,221   7/1968   Snyder et al. _____ 424—157

OTHER REFERENCES

Kirk-Othmer, Encyclopedia of Chemical Technology, vol. 2, 2nd ed., 1963, pp. 42–53.

Chem. ABS. 1954, vol. 48:4284g.

Chem. ABS. 1963, vol. 58:265b.

Chem. ABS. 1963, vol. 58:13402e.

A. Osol, et al., Dispensatory of the United States of America (U.S.D.) 25th (1955) Lippincott, p. 57.

T. O. Soine et al., Rogers Inorganic Pharmaceutical Chemistry (1961), Lea and Febiger pp. 466–468.

ALBERT T. MEYERS, Primary Examiner

D. J. FUNDERBURK, Assistant Examiner

U.S. Cl. X.R.

23—143